United States Patent
Hosseini et al.

(10) Patent No.: US 10,613,410 B2
(45) Date of Patent: Apr. 7, 2020

(54) LARGE SCALE OPTICAL PHASED ARRAY

(71) Applicant: ANALOG PHOTONICS LLC, Boston, MA (US)

(72) Inventors: Ehsan Hosseini, Milton, MA (US); Michael Watts, Hingham, MA (US); Christopher Poulton, Boston, MA (US)

(73) Assignee: Analog Photonics LLC, Boston, MA (US)

( * ) Notice: Subject to any disclaimer, the term of this patent is extended or adjusted under 35 U.S.C. 154(b) by 285 days.

(21) Appl. No.: 15/784,110

(22) Filed: Oct. 14, 2017

(65) Prior Publication Data
US 2018/0107091 A1  Apr. 19, 2018

Related U.S. Application Data

(60) Provisional application No. 62/408,220, filed on Oct. 14, 2016.

(51) Int. Cl.
*G02F 1/29* (2006.01)
*G02F 1/295* (2006.01)

(52) U.S. Cl.
CPC ............ *G02F 1/292* (2013.01); *G02F 1/2955* (2013.01); *G02F 2001/291* (2013.01)

(58) Field of Classification Search
None
See application file for complete search history.

(56) References Cited

U.S. PATENT DOCUMENTS

| | | | |
|---|---|---|---|
| 4,661,786 A | 4/1987 | Bender | |
| 4,764,738 A | 8/1988 | Fried | |
| 5,233,673 A | 8/1993 | Vali et al. | |
| 5,543,805 A * | 8/1996 | Thaniyavarn | H01Q 3/2676 342/368 |
| 6,128,421 A | 10/2000 | Roberts | |
| 6,469,822 B1 | 10/2002 | Zhu | |
| 6,490,076 B2 | 12/2002 | Pepper | |
| 6,597,836 B2 | 7/2003 | Johnson et al. | |
| 7,095,925 B2 | 8/2006 | Grunnet-Jepson et al. | |
| 8,009,990 B1 | 8/2011 | Mitchell | |
| 8,014,050 B2 | 9/2011 | McGrew | |
| 8,200,055 B2 | 6/2012 | Subbaraman et al. | |
| 8,344,945 B2 | 1/2013 | Craig et al. | |
| 8,615,028 B1 | 12/2013 | Sayyah et al. | |
| 8,699,137 B2 | 4/2014 | McGrew | |
| 8,829,417 B2 | 9/2014 | Krill et al. | |
| 9,081,252 B2 | 7/2015 | Aflatouni et al. | |
| 9,124,373 B2 | 9/2015 | Aflatouni et al. | |
| 9,482,887 B2 | 11/2016 | Horie et al. | |

(Continued)

OTHER PUBLICATIONS

S. Chung et al., "A 1024-Element Scalable Optical Phased Array in 0.18 µm SOI CMOS", IEEE International Solid-State Circuits Conference, 2017, pp. 262-264.

(Continued)

*Primary Examiner* — Michelle R Connelly
(74) *Attorney, Agent, or Firm* — Young Basile Hanlon & MacFarlane, P.C.

(57) ABSTRACT

Aspects of the present disclosure describe configurations of, and methods for operating a large-scale optical phased array for contemporary applications including LIDAR, optical communications, imaging, and displays—among others.

20 Claims, 17 Drawing Sheets

(56) References Cited

U.S. PATENT DOCUMENTS

| | | | |
|---|---|---|---|
| 9,595,757 B2 | 3/2017 | Saint Clair et al. | |
| 9,632,345 B2 | 4/2017 | Dorschner et al. | |
| 9,696,605 B2 | 7/2017 | Russo et al. | |
| 9,753,351 B2 | 9/2017 | Eldada | |
| 2009/0092158 A1 | 4/2009 | Izadpanah et al. | |
| 2009/0303573 A1 | 12/2009 | Hillis et al. | |
| 2013/0044309 A1 | 2/2013 | Dakin et al. | |
| 2016/0139266 A1 | 5/2016 | Montoya et al. | |
| 2016/0170287 A1 | 6/2016 | Bitauld et al. | |
| 2018/0039154 A1* | 2/2018 | Hashemi | G02F 1/2955 |

OTHER PUBLICATIONS

C. V. Poulton et al., "Optical Phased Array with Small Spot Size, High Steering Range and Grouped Cascaded Phase Shifters", Advanced Photonics Congress 2016, IW1B.2.

* cited by examiner

LARGE SCALE OPTICAL PHASED ARRAY

CROSS REFERENCE TO RELATED APPLICATIONS

This application claims the benefit of U.S. Provisional Patent Application Ser. No. 62/408,220 filed 14 Oct. 2016 which is incorporated by reference as if set forth at length herein.

TECHNICAL FIELD

This disclosure relates generally to beam steering of light and more particularly to large scale optical phased arrays (OPA) that steer coherent light.

BACKGROUND

As is known, laser light beams have been employed in many product applications including laser printers, scanners, projectors, CD players and CD-ROM readers. More recently, such light beams have been employed in contemporary applications including light detection and ranging (LiDAR), free space communications, and holographic displays. Many of these applications require the relative movement of the laser beam across an area or surface, which is achieved by mechanical means. Typically, this takes the form of movement of a laser device itself, the deflection of the beams by movable mirrors and/or prisms, or movement of the surface onto which the beam is projected. Historically, devices using mechanical moving parts have tended to be more expensive, less reliable, and slower than solid state devices which may achieve the same result without moving parts.

Phased array radar systems—which operate in the microwave range of the electromagnetic spectrum—have used beams of electromagnetic radiation which are steered without movable antennae. Consequently, attempts to apply phased array principles to optical phased array systems have been more recently made.

Recent advancements in silicon photonics fabrication technologies has precipitated the development of nanophotonic optical phased arrays that have proven useful in many of the noted contemporary applications. Given their utility, further development and/or improvement of nanophotonic optical phased arrays would represent a welcome addition to the art.

SUMMARY

An advance in the art is made according to aspects of the present disclosure directed to scalable optical phased arrays comprising a plurality of array elements, each individual one of the plurality of array elements including a phase shifter and an emitter, wherein the plurality of array elements is configured as a plurality of sub-phased arrays, each individual one of the plurality of sub-phased arrays having a phase residue phase shifter.

In sharp contrast to the prior art, optical phased arrays according to the present disclosure are advantageously scalable to many hundreds or thousands of elements while reducing the number of Input/Output signals and interconnects required for operation.

BRIEF DESCRIPTION OF THE DRAWING

A more complete understanding of the present disclosure may be realized by reference to the accompanying drawing in which.

Figure 1:
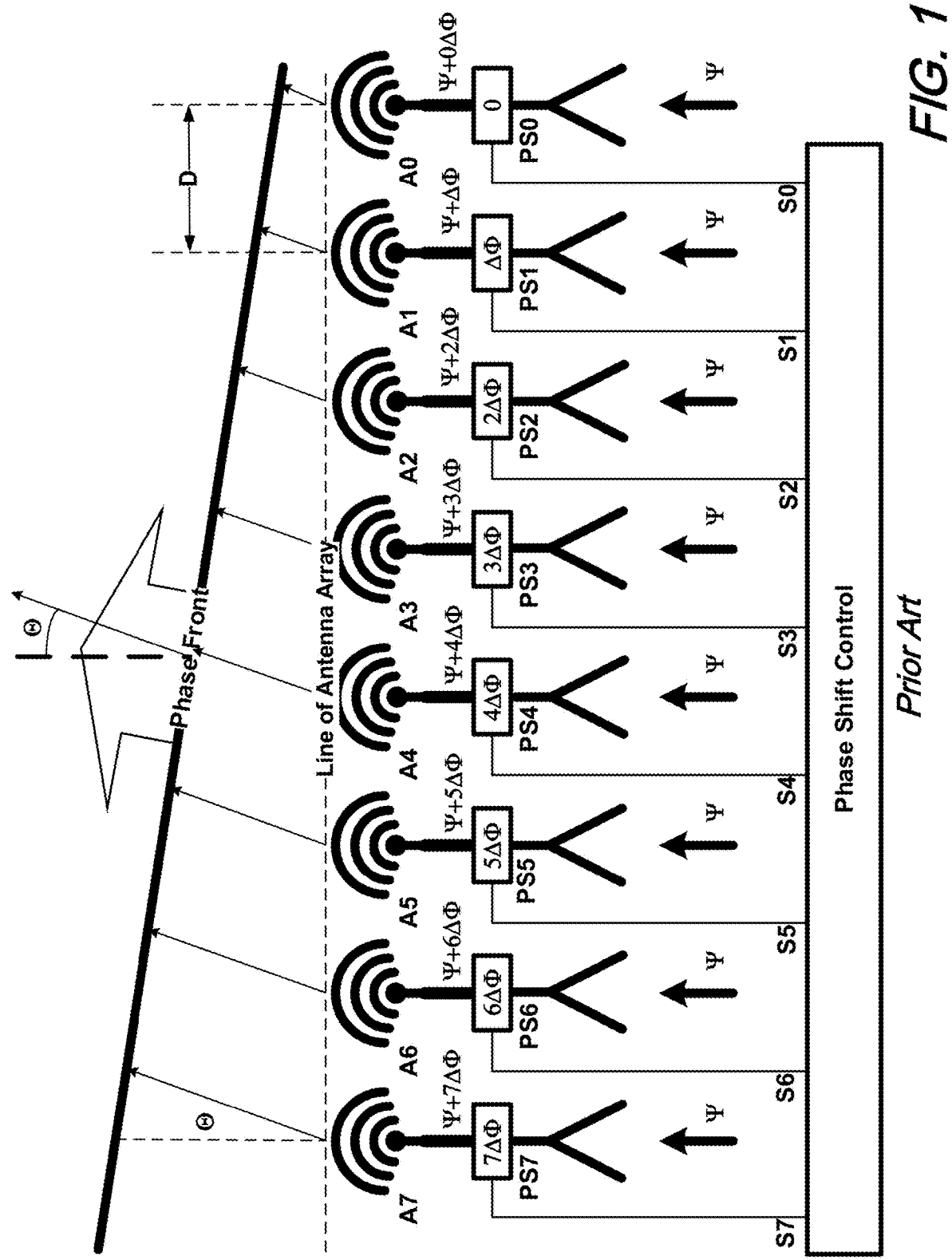
FIG. 1 is a schematic illustrating a prior-art phased array arrangement.

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

By way of some further background—and with specific reference to FIG. 1—showing a prior art phased array antenna arrangement illustrating beam steering—we begin by noting that a phased array is an array of antennae grouped together to form a single antenna. A beam produced by the phased array antenna may be steered—without physically moving the antenna—by adjusting phase(s) of signals applied to the individual antennae.

As depicted in FIG. 1 a number of substantially identical antennae elements (A0, . . . A7) are arranged into a regular, one dimensional array (could also be 2D) and spaced a distance D, apart from one another. We note that while we have illustratively shown the spaced apart distance as a uniform D, such distance could be aperiodic. A source of electromagnetic radiation having an initial phase of $\Psi$ (this could be linear . . . first element is $\Delta\Psi$, second is $2\Delta\Psi$, etc.,)—not specifically shown—is directed separately to a phase shifter element (PS0, . . . PS7) each individually associated with a respective antennae element. A phase shift control unit provides separate phase shift control signals (S0, . . . S7) to each phase shifter element, respectively. Each of the phase shifter elements causes a phase shift to the electromagnetic radiation passing through it, depending upon its respective phase shift control signal such that the phase of the radiation arriving at an antennae element is shifted by a particular amount. As depicted in the figure, the phase difference between radiation emerging from adjacent phase shifter elements is made to vary by a constant amount—if we are creating a plane wave—by appropriate differences in the phase shift control signals. This results in a progression in the phases across the array with the radiation from each antenna element lagging behind the corresponding radiation from the next antennae element such that the radiation emerges from the phased array antenna as a combined phase front shown in the figure at an angle $\theta$ to the line of the antenna array.

At this point we note that the present disclosure is applicable to aperiodic arrays in addition to periodic one(s). And while the phase distribution with such aperiodic configurations is not generally a linear/sawtooth phase distribution—a plane wave can nevertheless be produced. As such, discussions and analysis disclosed with respect to any saw-tooth functions are applicable to aperiodic arrays as well.

Accordingly, the direction of the phase front may be selectively controlled by varying the phase differences by appropriate differences in the phase shift control signals and focusing is made possible if the phase shifts are not equal.

Figure 2:
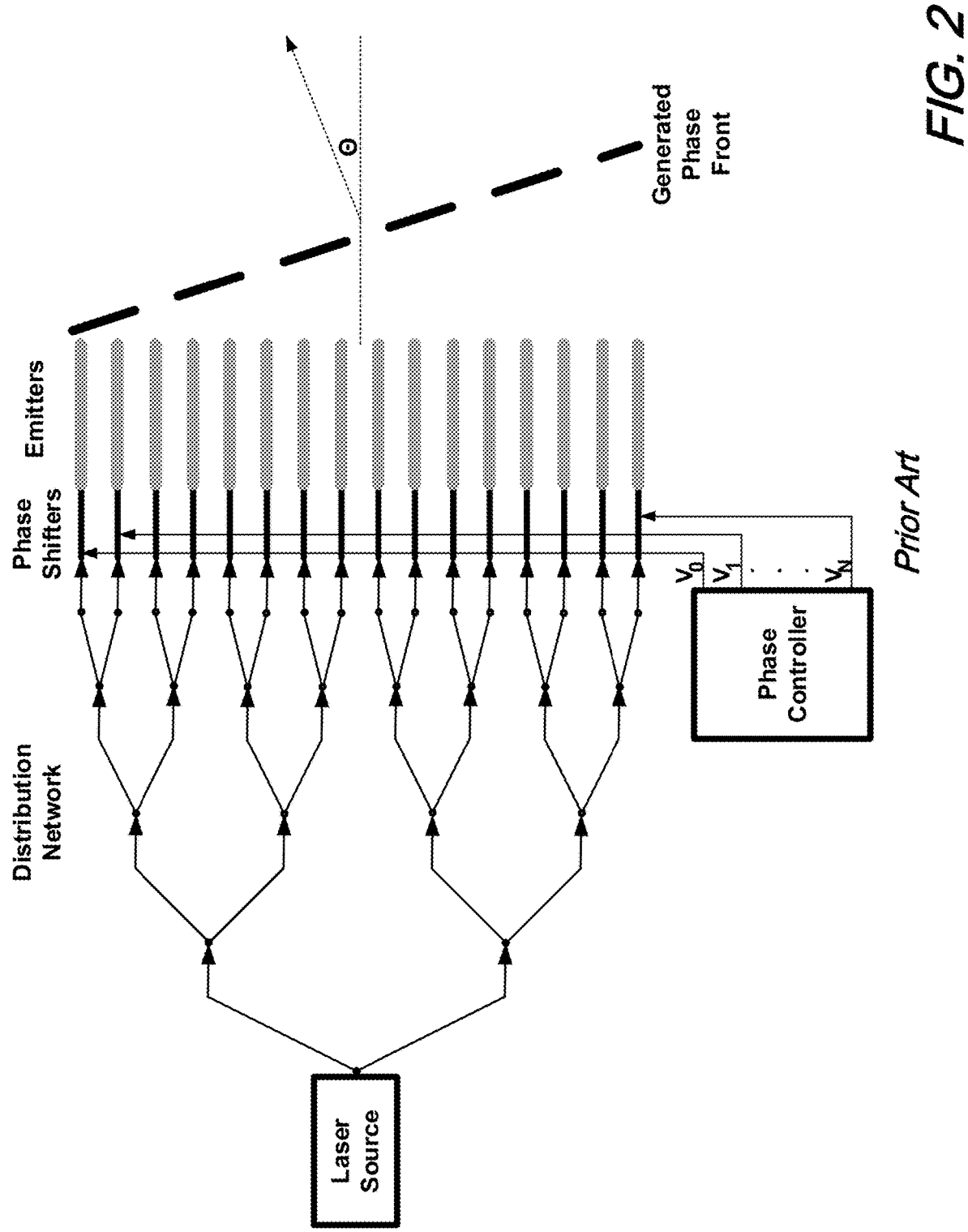
FIG. 2 is a schematic illustrating a prior-art optical phased array arrangement.

Turning now to FIG. 2, there is shown a schematic of an illustrative optical phased array arrangement as is known in the art and may be advantageously implemented on one or more semiconductor substrates using known—i.e., CMOS—fabrication techniques. As may be observed from that figure, such optical phased array arrangement includes an optical source, a distribution network, a set of individually controllable phase shifters and a like-numbered, corresponding set of emitters.

Operationally, a laser source outputs light that is received by the distribution network. As shown in the figure, the illustrative distribution network is arranged as a binary tree (or tree of m-output splitters) exhibiting a 1×N topology and may advantageously constructed from Si (or SiN) waveguides on a suitable substrate. Light received by the distribution network is fed to a set of N phase shifters and the phase shifted light is subsequently directed to N respective emitters. Each of the N individual phase shifters are controlled through the effect of a phase controller by selective—and respective—application of phase control signals $V_0, \ldots, V_N$. As described previously—and more generally—selective application of the phase control signals will produce a desired phase front that is steerable. In a preferred configuration, the emitter elements are separated from neighboring elements by less than half a wavelength, emit electromagnetic radiation (optical, microwave, etc.), and are controllably phased such that the emitted radiation combines constructively in a desired direction.

As illustrated in FIG. 2, phase control may be provided in the waveguide feed distribution network and advantageously achieved based on any of a number of known effects and devices employing same including, thermo-optic, electro-optic, mechanical induced, fluidic, liquid crystal, non-linear, acousto-optic and stress-induced.

At this point we note that since each of the phase shifters employed in such prior art configurations are individually controlled to generate a desired phase front, significant signal interconnect/distribution problems arise. Such problems are compounded when contemplating the construction of optical phased arrays having hundreds or thousands of emitters. Fortunately, optical phased array configurations according to the present disclosure help cure these noted and other problems as well.

Figure 3:
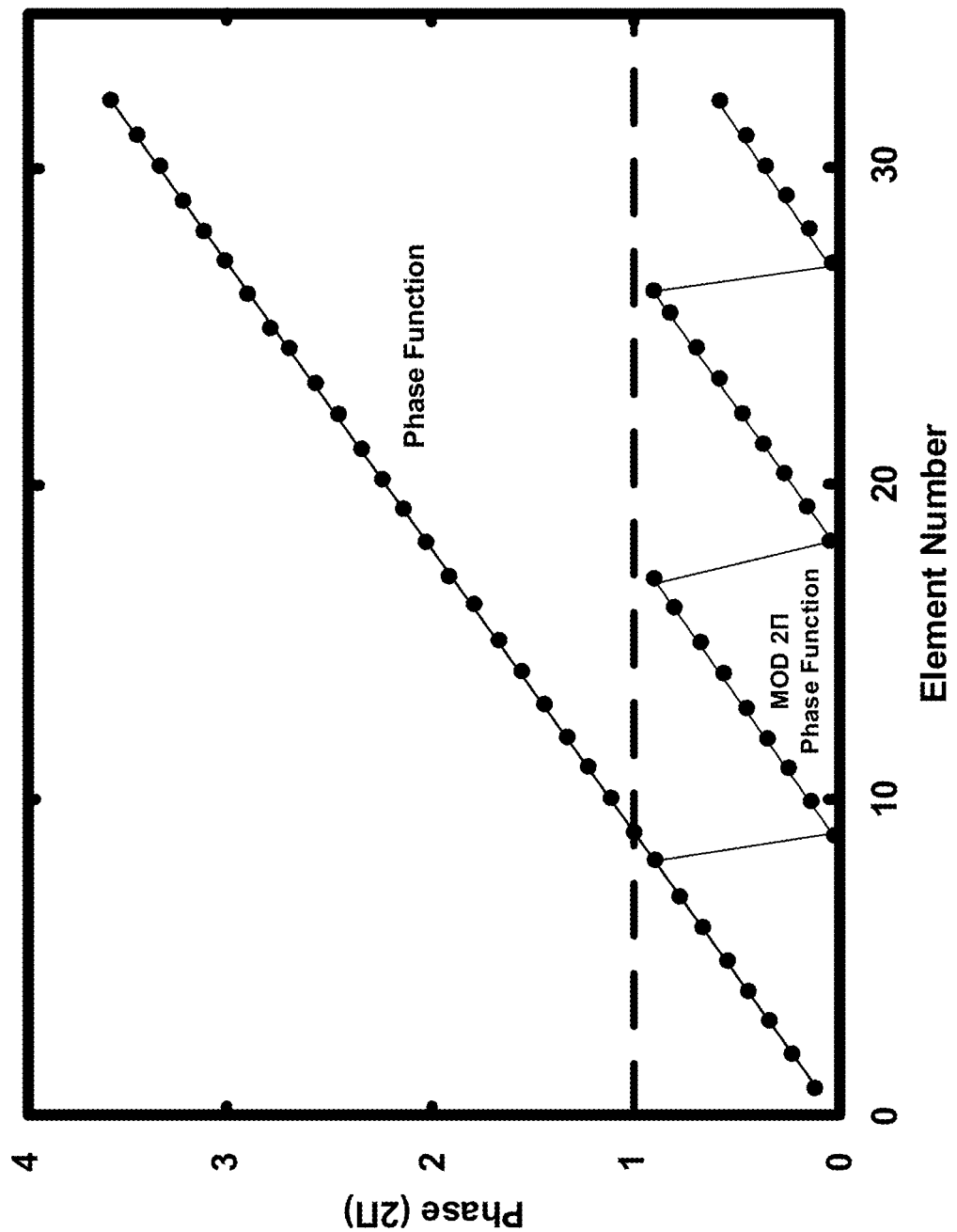
FIG. 3 is a plot showing an illustrative "unwapped phase function" and a modulo $2\pi$ wrapped version of the same phase function for 32 element optical phased arrays according to aspects of the present disclosure.
Figure 4:
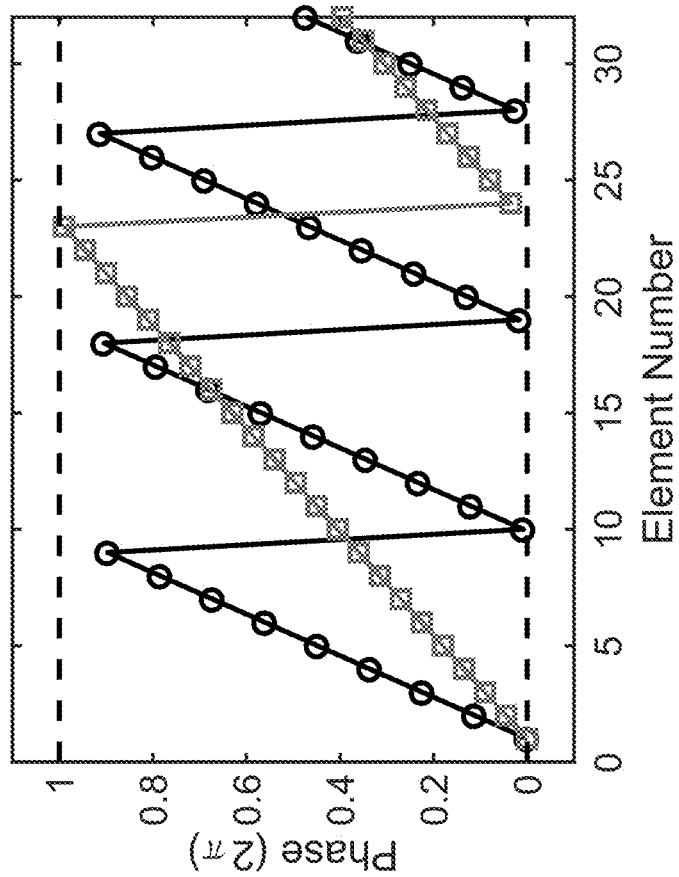
FIG. 4 is a plot showing an illustrative "saw-tooth" phase functions for two different phased array emission angles according to aspects of the present disclosure.

Turning now to FIG. 3, there is shown a plot of an illustrative linear phase function for an array of 32 elements. As may be appreciated by those skilled in the art, to realize such a linear phase function many of the elements must exhibit significant phase shifts (i.e., from 0 to nearly $4\pi$) when the phase is not "wrapped" in $2\pi$. According to aspect of the present disclosure, such a linear phase function is effectively achieved by grouping elements such that each grouping contributes a modulo $2\pi$ phase function. As may be further observed from this figure, our modulo $2\pi$ approach replicates a "saw-tooth" function that is periodic for certain emission angles wherein the period depends on that emission angle. Such saw-tooth functions for two of the possible different phased array emission angles are shown graphically in FIG. 4.

Figure 5B:
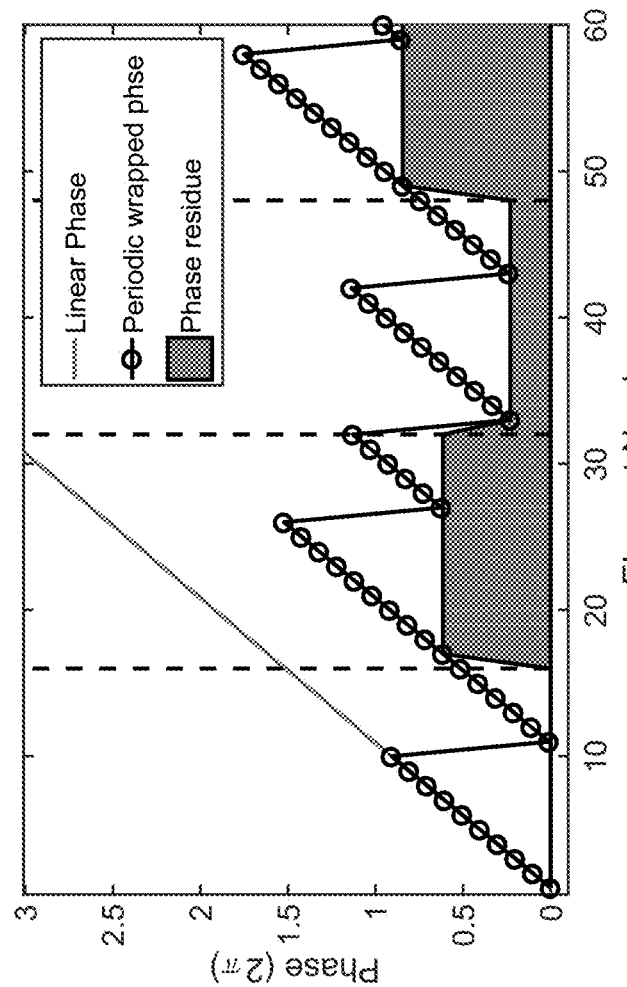
FIG. 5(A), and FIG. 5(B) are graphs illustrating FIG. 5(A) repeating a periodic phase function for groups of elements in an optical phased array and FIG. 5(B) a phase residue offset added to the groups of elements according to aspects of the present disclosure wherein both exhibit a forced periodicity with phase residue in which 5(B) is wrapped in $2\pi$.
Figure 5A:
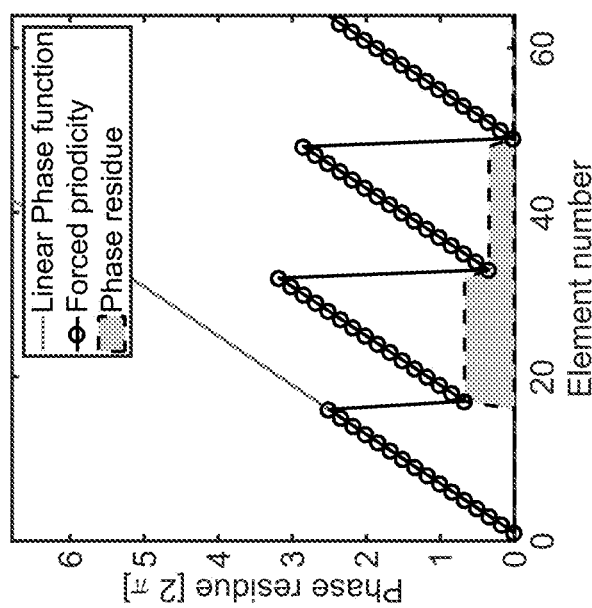

As may now be understood and readily appreciated by those skilled in the art, optical phased arrays according to the present disclosure advantageously employ a periodic phase function exhibiting a "phase ramp" that is repeated after a certain number of elements, i.e., N. In this manner, the same periodic phase function for elements 1 to N is used again for elements N+1 to 2N and again for elements 2N+1 to 3N. This is repeated for all elements in the array. Such a repeating phase function is illustrated graphically in FIG. 5(A).

We note at this point that since the phase function is not necessarily a periodic function of the element number for a chosen N, there is a residual phase offset that may be added to the entire set of elements for a given group of N elements. Such a residual phase offset is illustratively shown in FIG. 5(B).

Note further that this residual phase offset is the difference between the N+1 element and its nearest modulo $2\pi$ point and that this offset changes as a beam output from an optical phased array is steered across a field. Accordingly, such phase residue offset must be individually determined for each multi-element group of a phased array of elements.

We note further at this point that the magnitude of residual phase offset is not only a function of the steering angle of a device, rather it is also a function of a number of other factors including: 1) the number of I/O supporting/driving the device; 2) the speed at which the residue adjustment takes place; and 3) the fabrication reproducibility of the device. With specific respect to #2, above, we note that the speed of a phase residue adjustment is further dependent upon the position of a phase residue adjustment shifter within a distribution network or in other words, the number of individual elements it affects.

Figure 6A:
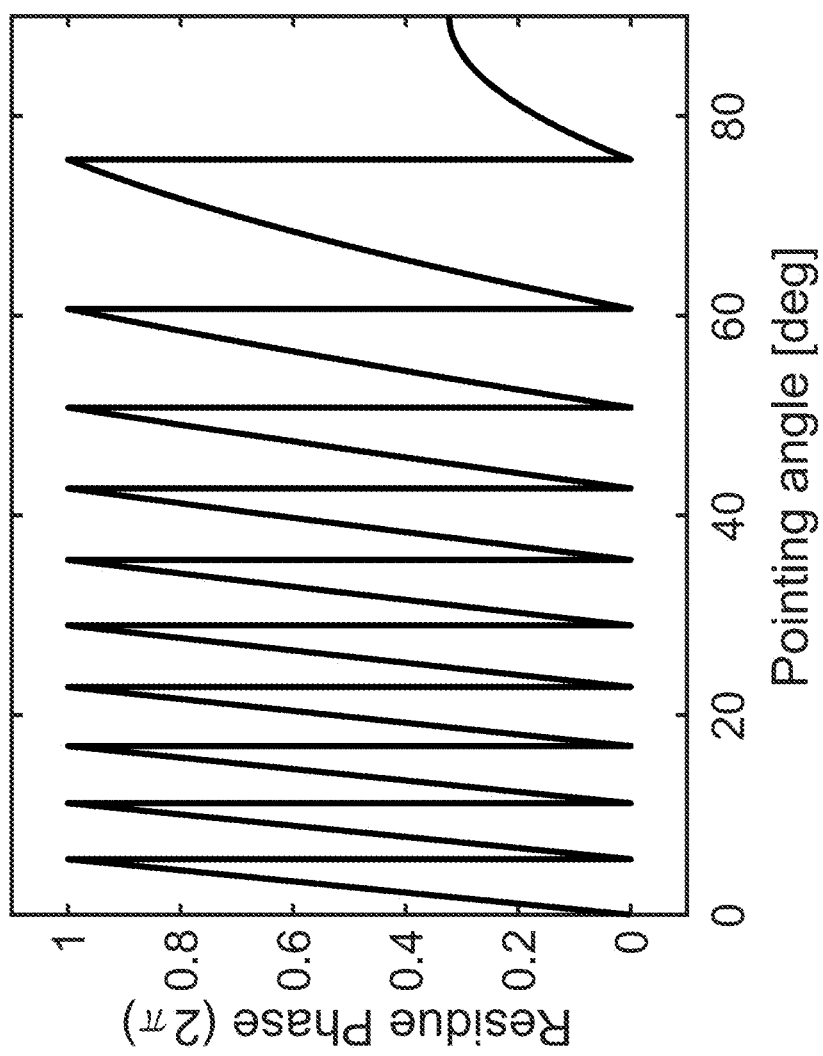
FIG. 6(A), and FIG. 6(B) are graphs illustrating phase residue ($2\pi$) vs. emission angle (deg.) for a single residue phase shifter at a given location in a distribution network (FIG. 6(A)) and for a phase shifter positioned at two different locations in a distribution network (FIG. 6(B)) illustrating the frequency of operation for the residue phase shifter varies with location of the residue phase shifter within a distribution network according to aspects of the present disclosure.
Figure 6B:
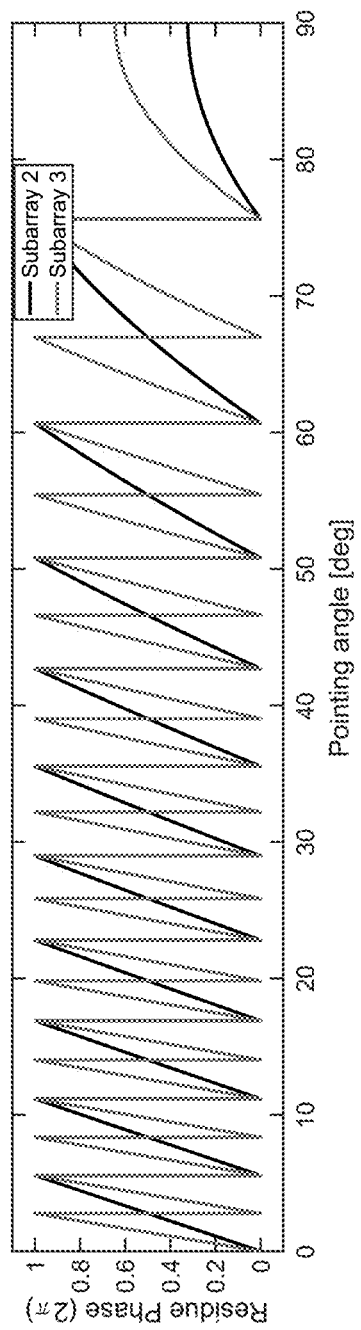

FIG. 6(A) and FIG. 6(B) show plots respectively illustrating phase residue offset as a function of emission angle for a second and a third group of elements that are part of an optical phased array according to aspects of the present disclosure.

Figure 7A:
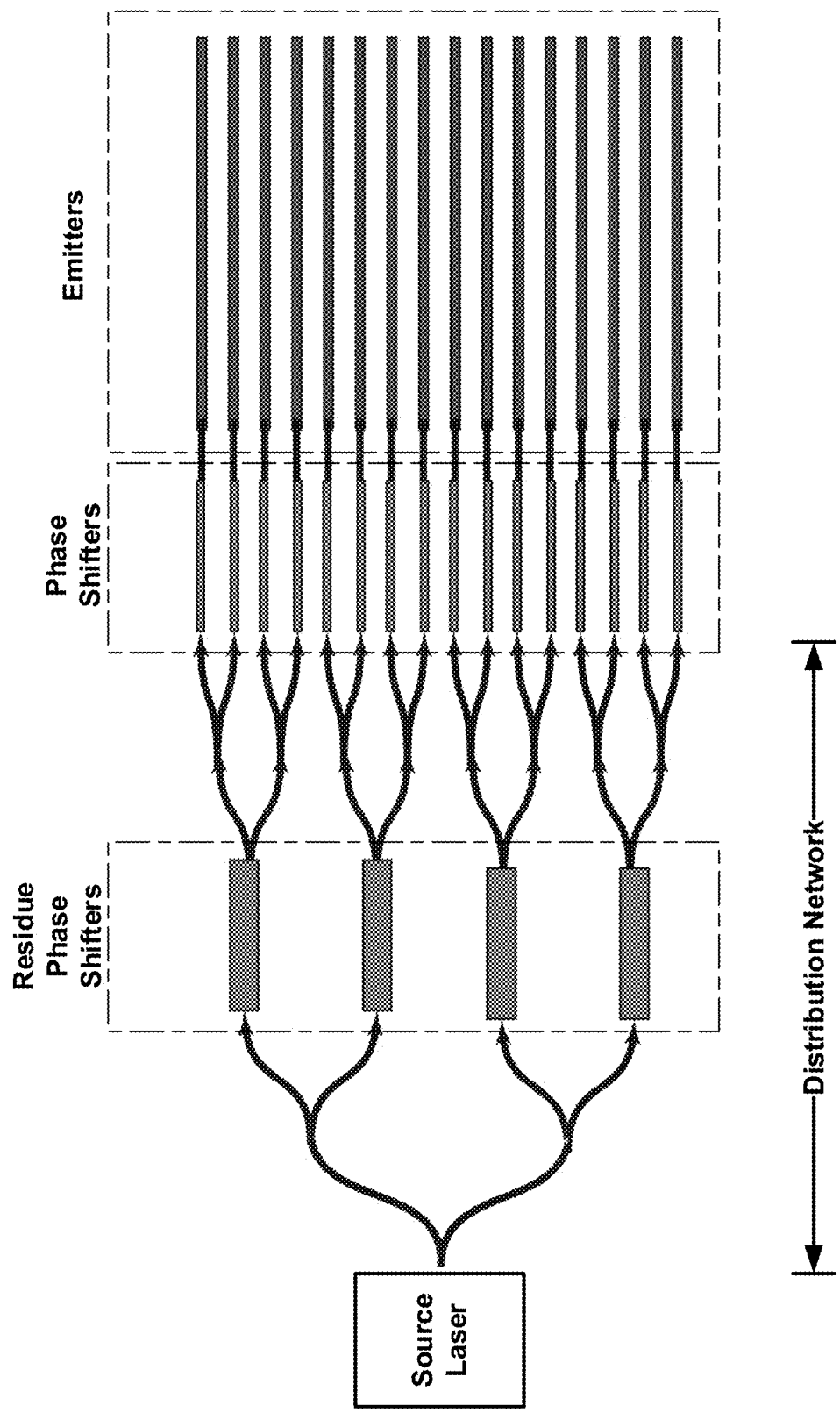
FIG. 7(A), FIG. 7(B), and FIG. 7(C) are schematics illustrating an optical phased array arrangement including source, emitters, phase shifters, residue phase shifters, distribution network, individually phase controlled elements, sub groups of elements, sub-tree(s), individually phase controlled sub-array(s), and output repeated ramp and phase residue, according to aspects of the present disclosure.
Figure 7B:
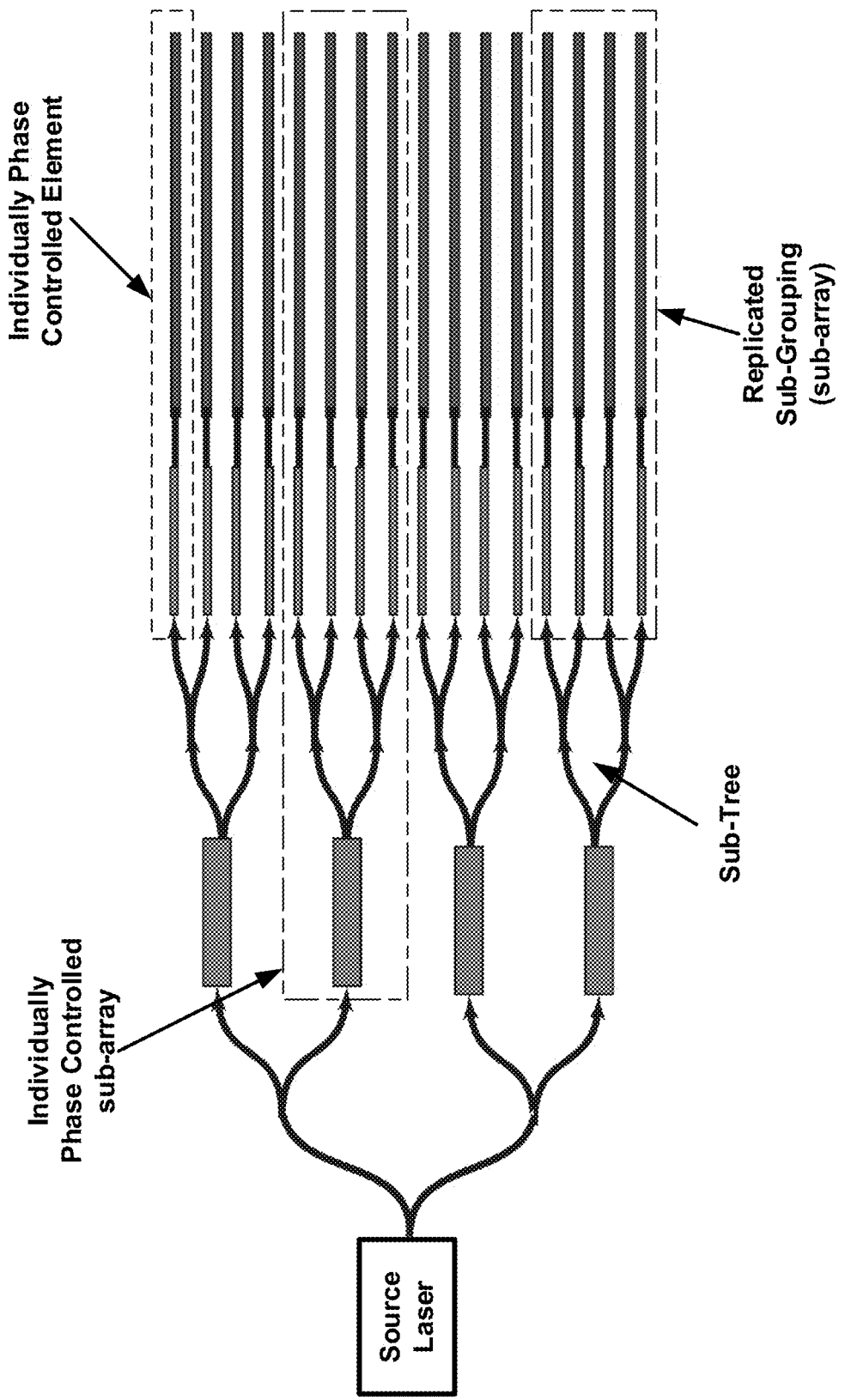
Figure 7C:
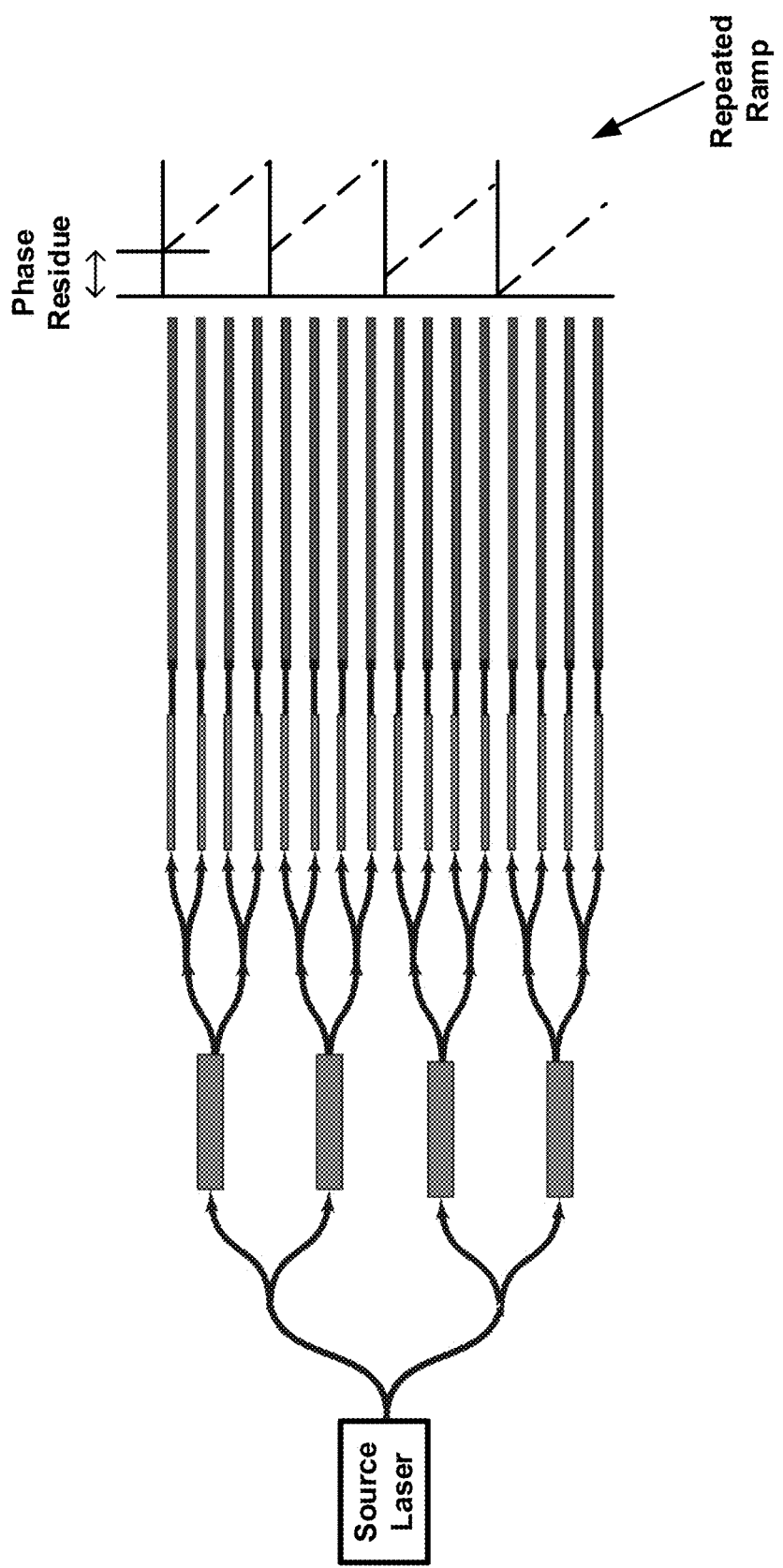

FIG. 7(A), FIG. 7(B), and FIG. 7(C) is a schematic illustrating an optical phased array arrangement including sub groups of elements each having a phase residue adjustment according to aspects of the present disclosure.

With simultaneous reference to FIGS. 7(A), 7(B), and 7(C), it may be observed that optical phased array arrangements according to the present disclosure generally include an optical source, a binary-tree distribution network, a set of individually controllable phase shifters, and a like-numbered, corresponding set of emitters. Shown further, sub-trees of the distribution network are identified (illustratively equal-sized), each of the sub-trees including a number of individual phase shifters and emitters providing a portion of an overall phase front as described previously. Shown positioned between each of the identified sub-trees and the optical source is an additional phase shifter that provides phase residue adjustment for the group of emitters included with given sub-tree.

Note that while not specifically shown in these figures, additional, known, passive/active optical (or other) components may be included in the overall structures. Their omission from the specific figures are for simplicity and ease of discussion.

Continuing with our simultaneous discussion of FIG. 7(A), FIG. 7(B), and FIG. 7(C), as illustrated, the optical phased array includes 16 elements (phase shifter—emitter) grouped into four replicated sub-groups (sub-arrays) defined by particular sub-trees of the distribution network—each illustrative sub-group (sub-array) has four elements each. A ramp function necessary for steering the emitted phase front is replicated for each replicated sub-group (defined by a sub-tree). As noted previously and depending on the emission angle—there is a residual phase adjustment applied to each sub-group (sub-array). As illustrated in the figure, such phase residue adjustment is provided by a respective phase shifter interposed in the binary-tree distribution network between a respective sub-tree and the optical source laser.

Advantageously, when an optical phased array configuration is constructed according to aspects of the present disclosure including the grouping and replication described, the number of individual Input/Output required for operation of the overall phased array is significantly reduced as compared with prior art configurations.

We note at this point that the chosen size of the groupings or sub-phased arrays is dependent upon a number of considerations. More particularly, the size of the groupings is a function of: 1) the number I/O connections and/or lines employed to or from a particular phased array (or chip or photonic integrated circuit); 2) the speed at which a residue phase adjuster (shifter) must operate and 3) any fabrication reproducibility issue(s). Note further that the speed of operation of a given residue phase shifter is further dependent upon its location within a distribution network, and the number of individually phase controlled elements that it affects.

Figure 8:
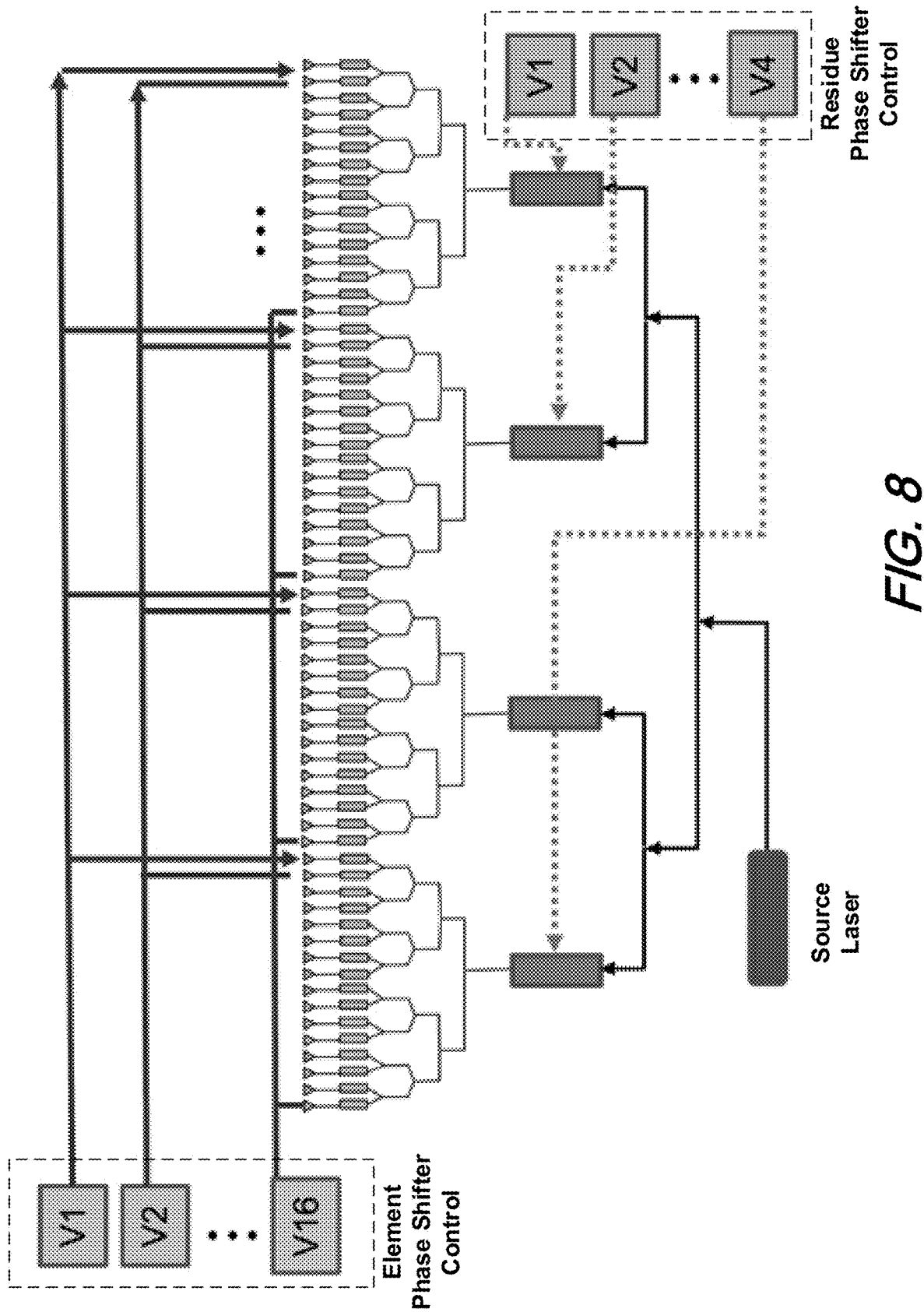
FIG. 8 is a schematic illustrating an optical phased array arrangement including sub groups of elements each having a phase residue adjustment according to further aspects of the present disclosure.

Such advantage is illustrated schematically in FIG. 8. With reference to that figure, there is shown an optical phased array of 64 elements optically interconnected with a tunable laser source by a 1×64 binary tree distribution network. We note at this point that while we have shown the distribution network to include a binary tree distribution network, such is for illustrative purposes only. As will be readily appreciated by those skilled in the art, such distribution network according to the present disclosure may be constructed from any or a combination of known structures including 1×N networks, binary trees, star coupler(s), 1×M splitter(s), directional coupler(s), free space, and other, known waveguide structures.

With continued reference to FIG. 8, the 64 elements are illustratively grouped into four sub-groups of 16 elements each (sub-phased array). Each of the sub-groups are part of a sub-tree of the entire of the distribution network. As described previously, each of the elements includes a phase shifter followed by an emitter. Those skilled in the art will readily appreciate that phase shifters employed may include thermo-optic one(s) while emitters may include grating-based design(s).

As noted, sub-groups of elements are defined wherein each sub-group comprises a sub-tree of the distribution network. Each sub-tree is associated with a phase residue adjustment phase shifter—one for each sub-tree.—which provides a phase residue adjustment for the sub-tree that it is associated with along with its sub-phased array. Such phase residue adjustment phase shifters are positioned at a point in the distribution network between the laser source and its associated sub-tree. In this manner, the phase residue adjustment may be made for an entire sub-tree by a single, associated phase shifter.

As those skilled in the art will readily appreciate and understood, this FIG. 8 illustratively shows 64 elements grouped into 16 elements each. Of course, this disclosure is not so limited and any number of elements and/or groupings are possible and contemplated within the capability of fabrication techniques at the time of fabrication. Also, it is known and understood that such fabrication may advantageously be made on a single, integrated semiconductor chip or photonic integrated circuit. Systems constructed according to the present disclosure may include both integrated electronic circuits and integrated photonic circuits—interconnected and/or integrated as appropriate.

Operationally, each set of elements comprising a particular sub-group outputs a similar ramp function that may be offset by a residue amount. Since each of the sub-groups outputs substantially the same ramp function, the number of I/O ports and/or electrical connectors may be reduced significantly.

As shown illustratively in FIG. 8, the number of control signals used to generate the ramp functions is reduced to the number of elements in a sub-tree since a particular signal is applied to all corresponding elements across the sub-trees. As shown in the figure, signal V1 is applied to a first element of each of the four sub-groups. Similarly, signal V2 is applied to the second element of each of the four sub-groups. Such signal distribution is repeated for all for all of the elements, i.e., V16 applied to the $16^{th}$ element of all four sub-groups. In this manner, only 16 I/O signals and associated connectors are required to control all 64 elements in the overall phased array. In addition to the element control signals, each one of the phase residue offset shifters are driven by a corresponding drive signal—one for each of the four individual phase residue offset shifters. Accordingly, where prior art designs would require at least 64 signals for a 64 element optical phased array configuration, only 20 are required for configurations according to the present disclosure. Note that for our discussion purposes we have excluded any ground I/O connectors from this discussion.

Figure 9:
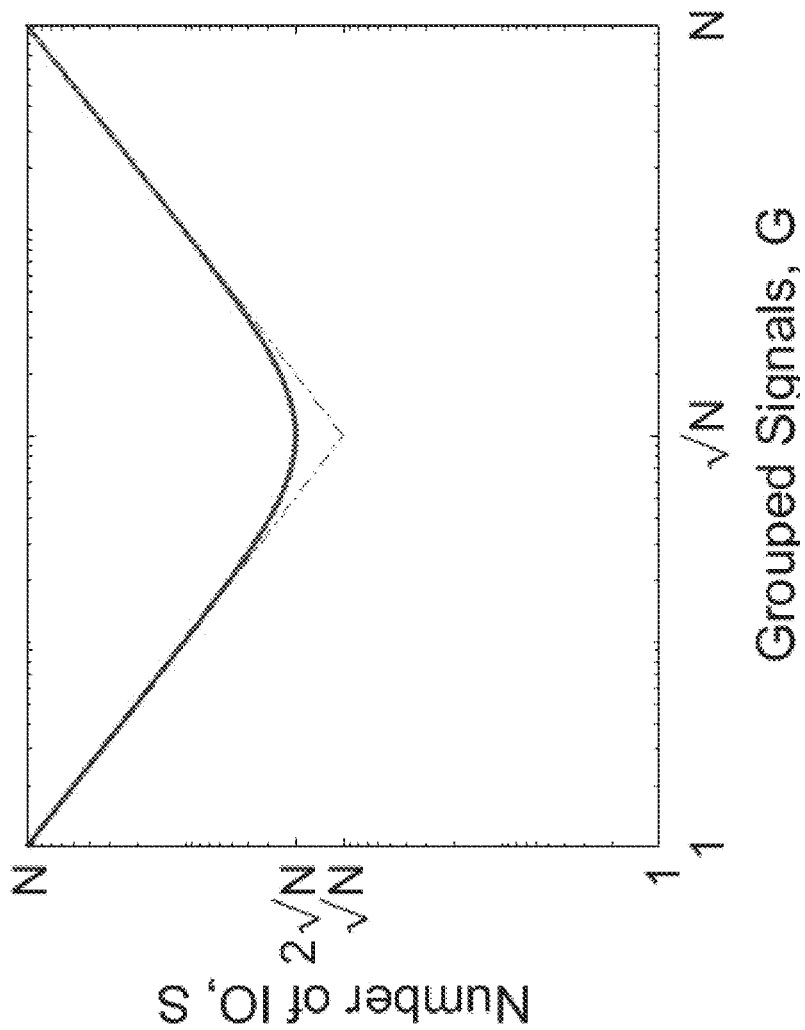
FIG. 9 is a plot illustrating the number of I/O signals required for N elements in an optical phased array as a function of the number of individual elements in a sub-group (sub-phased array) according to aspects of the present disclosure.

More generally, the number of active I/O signals required for an optical phased array configured according to the present disclosure where N is the total number of elements in the optical phased array and G is the number of elements in each sub-group (sub-phased array), the number of signals required is S=N/G+G. Such number of signals is minimized when an optical phased array is configured such that G=sqrt (N). Such relationships are shown graphically in FIG. 9, which is a plot illustrating the number of I/O signals required for N elements in an optical phased array as a function of the number of individual elements in a sub-group (sub-phased array) according to aspects of the present disclosure.

Figure 10B:
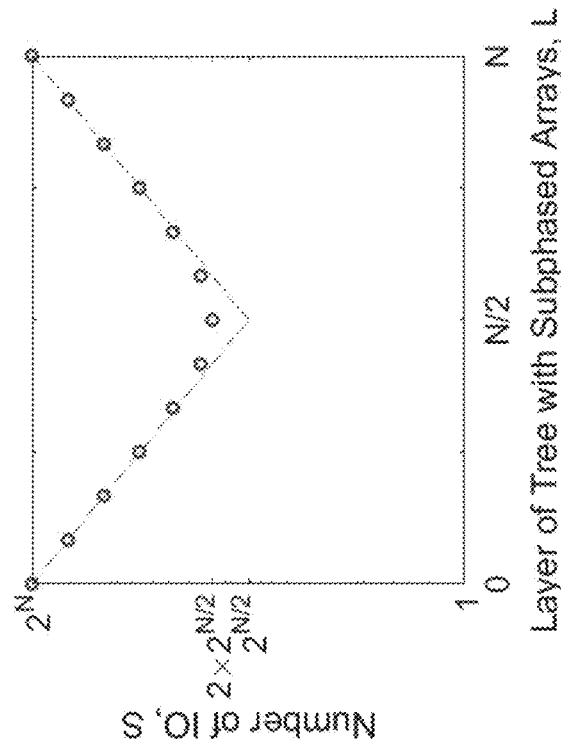
FIG. 10(B) is a plot illustrating the number of I/O signals required for sub-phased arrays configured from a sub-tree at a given level.
Figure 10A:
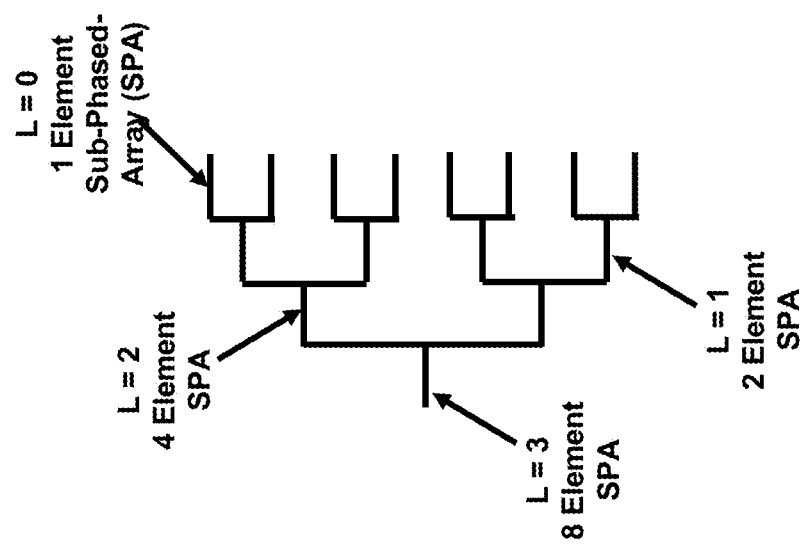
FIG. 10(A) is schematic illustrating a binary tree distribution network having a number of levels (L=3; 0, 1, . . . , 3) and the number elements in a sub-phased array configured in a sub-tree at a given level

Similarly, we can specify the I/O count for optical phased arrays configured using a binary tree distribution network of 1×2 splitters according to aspects of the present disclosure. With reference to FIG. 10(A), which illustrates a schematic of a binary tree distribution network having $2^N$ total elements (N=3) and L is the level at which residue phase shifters are positioned (from 0 to N) we observe that the total number of IO signals required may be represented by $S=2^N/2^L+2^L$, where the quantity $2^N/2^L$ defines the number of IO signals necessary to drive sub-phased array phase shifters (element shifters) and the quantity $2^L$ defines the number of IO signals necessary to drive residue phase shifters. Accordingly, a minimum number of IO signals is realized when L=N/2. FIG. 10(B) is a plot illustrating the number of IO signals required for sub-phased arrays configured at a given level of the tree.

Figure 11:
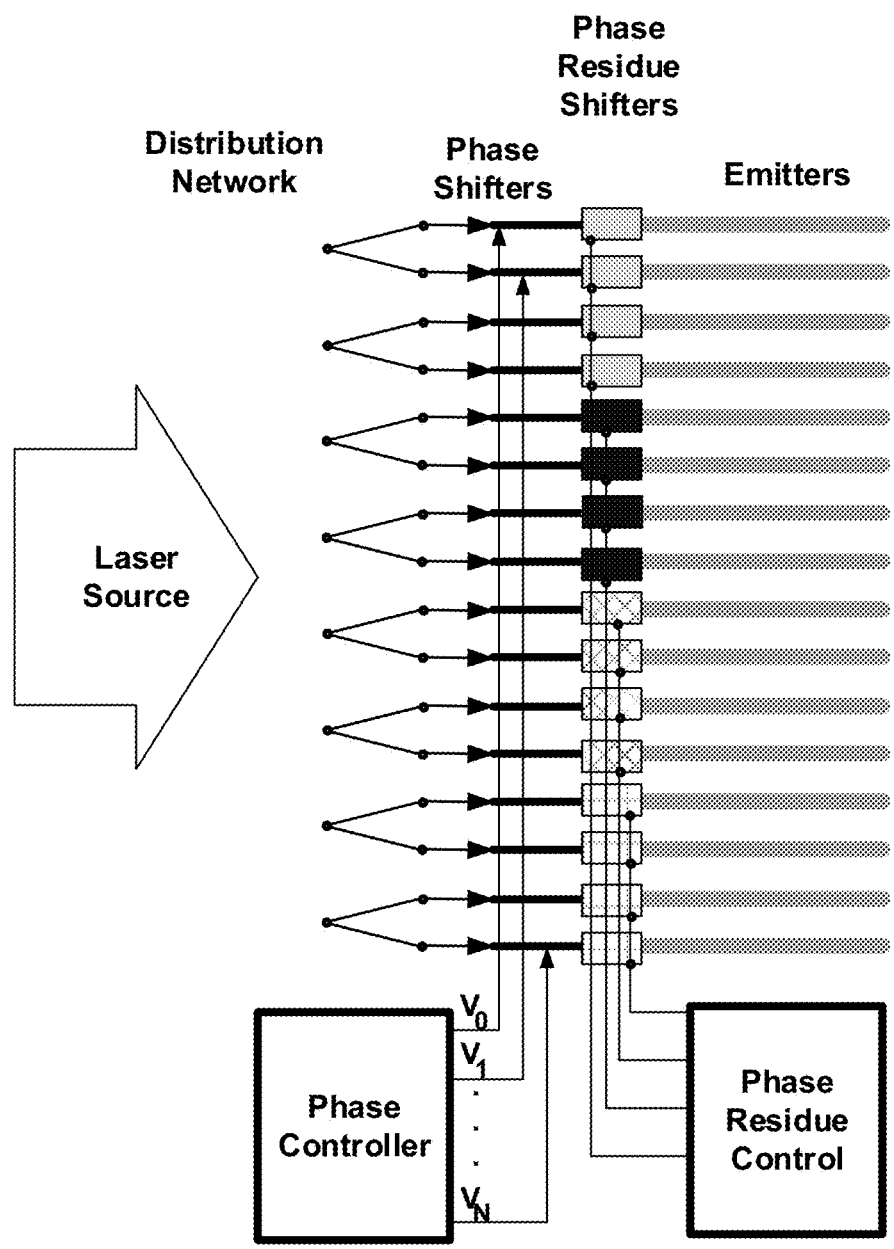
FIG. 11 is a schematic illustrating an optical phased array arrangement including sub groups of elements each having a phase residue adjustment according to further aspects of the present disclosure wherein the phase residue adjustment occurs after a first phase shifter.

FIG. 11 is a schematic of an illustrative alternative phased array structure according to further aspects of the present disclosure. With reference to that figure, it may be observed that each individual phase shifter/emitter pair (element) has interposed therebetween a residue phase shifter. As illustrated, the residue phase shifters are driven in groups, thereby applying a phase residue shift to a group of elements.

Figure 12A:
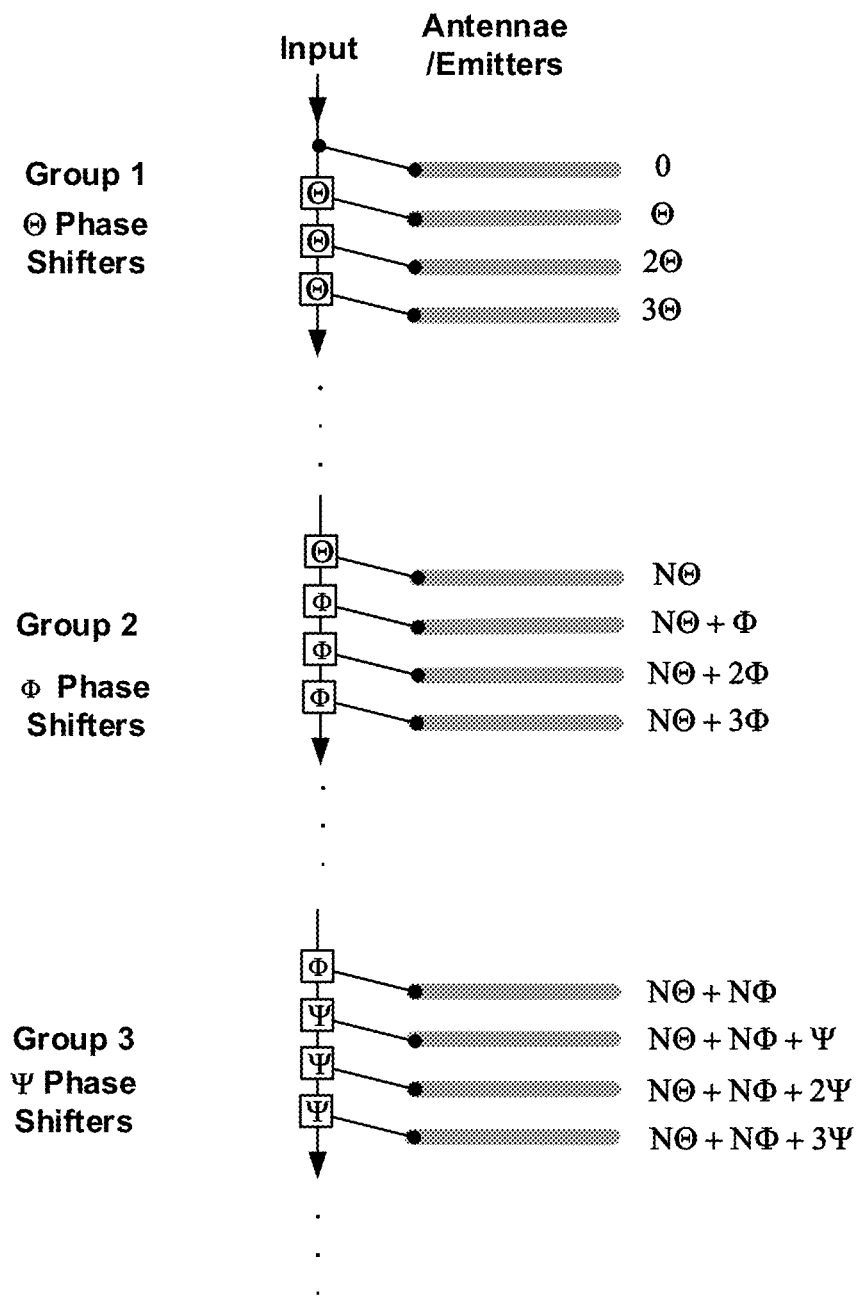
FIG. 12(A) is a schematic illustrating an optical phased array arrangement including cascaded elements and FIG. 12(B) is a schematic illustrating an optical phased array arrangement including the cascaded elements of FIG. 12(A) grouped such that phase residue adjustment shifts are made to each group according to aspects of the present disclosure.
Figure 12B:
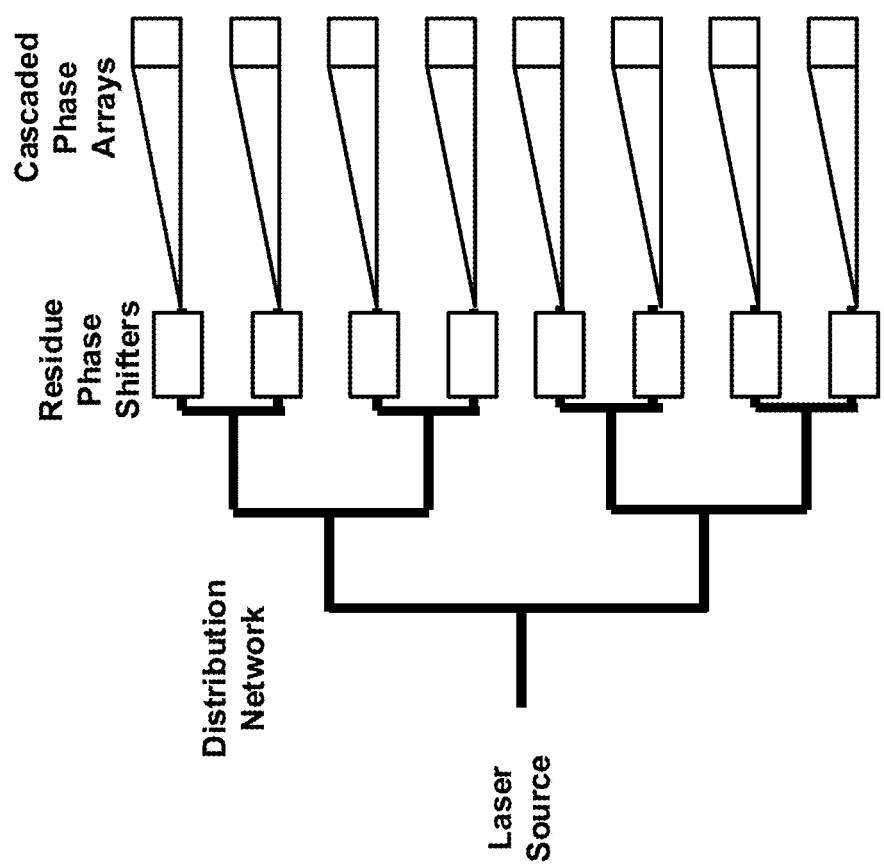

FIG. 12(A) is a schematic illustrating an optical phased array arrangement including cascaded elements and FIG. 12(B) is a schematic illustrating an optical phased array arrangement including the cascaded elements of FIG. 12(A) grouped such that phase residue adjustment shifts are made to each group according to aspects of the present disclosure;

As illustrated in FIG. 12(A), an input is received and subsequently emitted after undergoing cumulative phase shifts. Such structures advantageously permit grouping/ residue phase shifting according to the present disclosure as shown illustratively in the schematic of FIG. 12(B).

Figure 13:
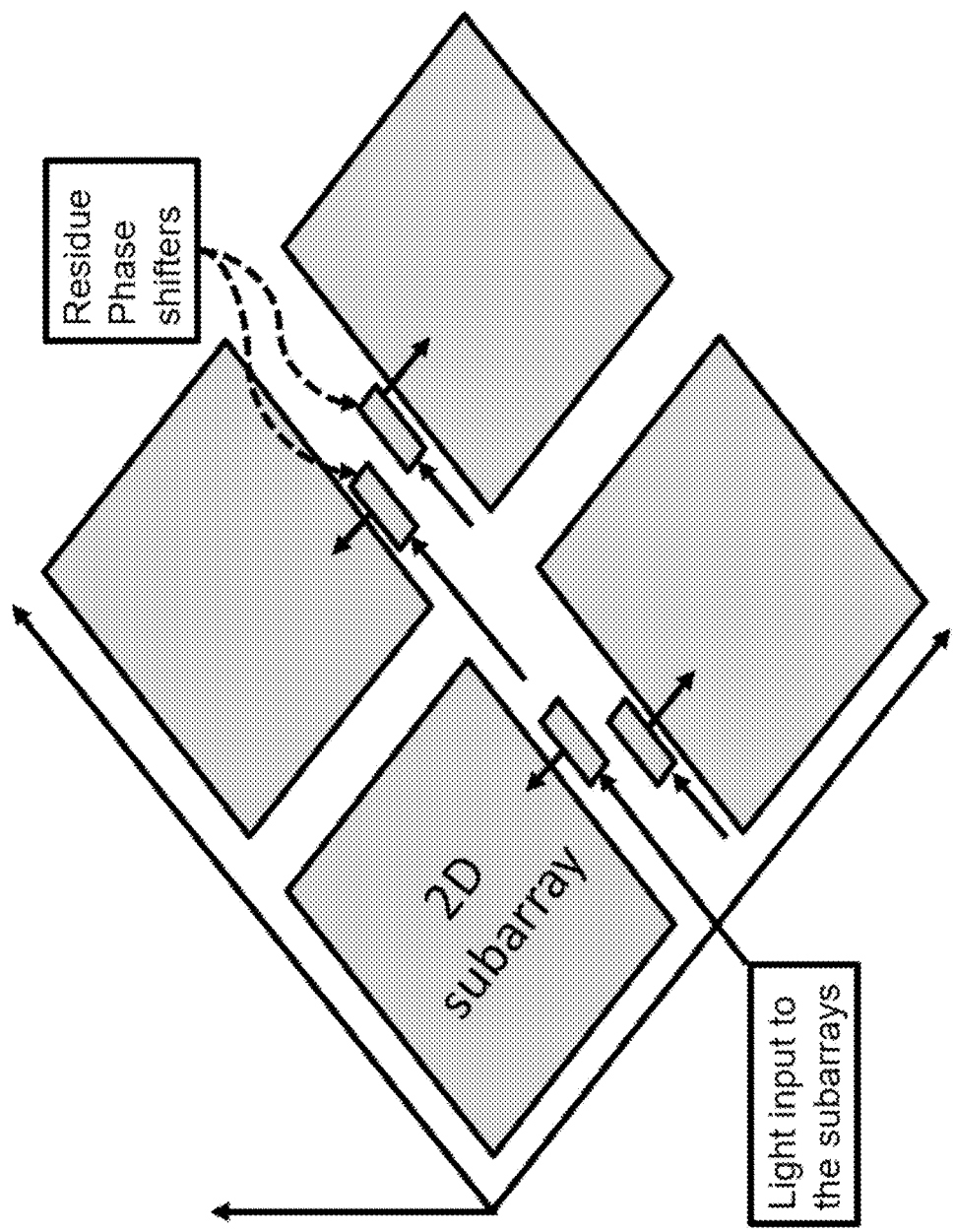
FIG. 13 is a schematic illustrating an optical phased array arrangement including a plurality of 2-dimensional subarrays constructed according to aspects of the present disclosure in which each 2D subarray is associated with a residue phase shifter.

FIG. 13 is a schematic illustrating an optical phased array arrangement including a plurality of 2-dimensional subarrays constructed according to aspects of the present disclosure in which each 2D subarray is associated with a residue phase shifter.

At this point, while we have presented this disclosure using some specific examples, those skilled in the art will recognize that our teachings are not so limited. In particular—and as we have previously noted—the disclosure is applicable to aperiodic systems as well as the illustrative structures, illustrative systems, and illustrative methods described. Of particular applicability are aperiodic sub-phased arrays. Accordingly, this disclosure should be only limited by the scope of the claims attached hereto.

The invention claimed is:

1. An optical phased array structure comprising:
   an optical source;
   an array of phase-controlled elements, said array of phase-controlled elements grouped into individually phase-controlled sub-arrays of the phased-controlled elements, and each of the individually phase-controlled sub-arrays associated with a respective sub-array phase shifter; and
   an optical distribution network comprising: (1) a source sub-network configured to optically connect the optical source with an input of each of the sub-array phase shifters, and (2) a plurality of sub-trees configured to optically connect respective sub-array phase shifters with a plurality of the phase-controlled elements;
   wherein each sub-tree of the optical distribution network is equal-sized such that optical paths from each phase-controlled element to a root of each sub-tree are substantially equal for each sub-tree.

2. The optical phased array structure of claim 1 wherein the phase-controlled elements of the array of phase-controlled elements are all individually phase-controlled elements of an array of individually phase-controlled elements.

3. The optical phased array structure of claim 2 wherein the individually phased-controlled elements included in the individually phase-controlled sub-arrays are contiguous members of the array of individually phase-controlled elements.

4. The optical phased array structure of claim 2 wherein each of the individually phase-controlled elements of the array of individually phase-controlled elements includes a respective element phase shifter optically connected with an optical emitter.

5. The optical phased array structure of claim 4 wherein the element phase shifters are configured to shift within a range of $2\pi$.

6. The optical phased array structure of claim 4 wherein at least one of the element phase shifters is one selected from the group consisting of: thermo-optic, electro-optic, mechanical, fluidic, liquid crystal, non-linear, acousto-optic, and stress-induced phase shifters.

7. The optical phased array structure of claim 4 wherein the optical emitter is one selected from the group consisting of: an optical grating, end-fire facet, plasmonic emitter, metal antennae, and mirror facet.

8. The optical phased array structure of claim 4, wherein respective ones of the individually phase-controlled elements of the individually phase-controlled sub-arrays are collectively phase-controlled such that an optical phased array having N individually phase-controlled elements, grouped into sub-arrays that each consist of G individually phase-controlled elements, uses approximately S=N/G+G control signals for controlling all of the sub-array phase shifters and element phase shifters, where G is approximately equal to the square root of N.

9. The optical phased array structure of claim 4 wherein the number of phase-controlled elements included in an individually phase-controlled sub-array is determined based at least in part on: a number of ports providing control signals for controlling all of the sub-array phase shifters and element phase shifters; and an operating speed required of a respective sub-array phase shifter.

10. The optical phased array structure of claim 2 configured to output an overall optical phase front, wherein each one of the individually phase-controlled sub-arrays is configured to output an optical phase front that is a modulo $2\pi$ of the overall optical phase front.

11. The optical phased array structure of claim 2 wherein each of the individually phase-controlled elements of the array of individually phase-controlled elements includes a respective element phase shifter optically connected with an optical emitter, and at least one of the element phase shifters and at least one of the sub-array phase shifters are not the same type of phase shifter wherein the phase shifter type is one selected from the group consisting of: thermo-optic, electro-optic, mechanical, fluidic, liquid crystal, non-linear, acousto-optic, and stress-induced phase shifters.

12. The optical phased array structure of claim 2, wherein selected ones of the individually phase-controlled elements of selected individually phase-controlled sub-arrays are collectively phase-controlled.

13. The optical phased array structure of claim 2 arranged in a dimension selected from the group consisting of: 2-dimensional array, and 3-dimensional array.

14. The optical phased array structure of claim 1 wherein the optical distribution network has a 1×N splitter topology and said source sub-network optically connects each individually phase-controlled sub-array to the optical source with a structure selected from the group consisting of: binary tree, star coupler, 1×M splitter network where M<N, directional coupler, free space structures, and slab waveguides.

15. The optical phased array structure of claim 1 wherein each of the individually phase-controlled sub-arrays is associated with a respective sub-array phase shifter assembly, said respective sub-array phase shifter assembly including more than one individual sub-array phase shifter configured to operate as a set.

16. The optical phased array structure of claim 15, wherein the respective sub-array phase shifter assembly is positioned in an optical path after another phase shifter in the optical path.

17. An optical phased array structure comprising:
a plurality of array elements, each individual one of the plurality of array elements including a respective element phase shifter optically connected with an emitter; and
said plurality of array elements configured as a plurality of sub-phased arrays, each individual one of the plurality of sub-phased arrays further including a phase residue phase shifter;
wherein respective ones of the array elements of the sub-phased arrays are collectively phase-controlled such that an optical phased array having N array elements, grouped into sub-phased arrays that each consist of G array elements, uses approximately S=N/G+G control signals for controlling all of the residue phase shifters and element phase shifters, where G is approximately equal to the square root of N.

18. The optical phased array structure of claim 17 wherein more than one of the sub-phased arrays are further grouped into a sub-sub-phased array.

19. The optical phased array structure of claim 17 further comprising:
an optical source; and
an optical distribution network configured to optically connect the optical source with an input of each of the sub-phased arrays.

20. The optical phased array structure of claim 17 wherein the number of array elements included in a sub-phased array is determined based at least in part on: a number of ports providing control signals for controlling all of the phase residue phase shifters and element phase shifters in the optical phased array; and an operating speed required of a respective phase residue phase shifter.

* * * * *

UNITED STATES PATENT AND TRADEMARK OFFICE
CERTIFICATE OF CORRECTION

PATENT NO. : 10,613,410 B2
APPLICATION NO. : 15/784110
DATED : April 7, 2020
INVENTOR(S) : Ehsan Hosseini, Michael Watts and Christopher Poulton It is certified that error appears in the above-identified patent and that said Letters Patent is hereby corrected as shown below:

In the Specification

At Column 1, Line number 11, before the "TECHNICAL FIELD", please insert the following paragraph:
--STATEMENT AS TO FEDERALLY SPONSORED RESEARCH
This invention was made with government support under contract no. HR0011-16-C-0108 awarded by DARPA. The government has certain rights in the invention.--

Signed and Sealed this
Sixth Day of June, 2023

Katherine Kelly Vidal
*Director of the United States Patent and Trademark Office*